United States Patent [19]
Bader

[11] 3,721,422
[45] March 20, 1973

[54] PNEUMATIC PRESSURE POSTION ADJUSTING CONTROLLER

[75] Inventor: Horst Bader, 7000 Stuttgart 80, Germany

[73] Assignee: J. C. Eckardt AG, Stuttgart, Germany

[22] Filed: March 25, 1971

[21] Appl. No.: 128,042

[30] Foreign Application Priority Data

March 25, 1970 Germany.....................P 20 14 308.2

[52] U.S. Cl........................................251/28, 137/85
[51] Int. Cl. ....F16k 31/145, G05d 16/00, F15b 5/00
[58] Field of Search ..........................251/28; 137/85

[56] References Cited

UNITED STATES PATENTS 2,298,112  10/1942  Edwards et al. ......................251/28 X
3,455,319  7/1969  Hogel ..........................137/596.18 X

*Primary Examiner*—Arnold Rosenthal
*Attorney*—Craig and Antonelli

[57] ABSTRACT

A pneumatic pressure position adjusting controller which includes a differential pressure amplifier providing first and second output pressures from a comparison unit responsive to pressures provided by the first and second pressure chambers, the second output pressure from the differential pressure amplifier being compared to an input pressure by a pressure distributor which applies a control pressure to the second pressure chamber, the first output pressure of the differential pressure amplifier being applied to the first pressure chamber.

1 Claim, 4 Drawing Figures

PNEUMATIC PRESSURE POSTION ADJUSTING CONTROLLER

This invention relates to a pneumatic position adjusting controller having a pair of pressure chambers defined by elastic walls and a spring arrangement connecting one of the pressure chambers to a differential amplifier element.

Pneumatic pressure controllers are necessary for various purposes. They are employed, for example, to indicate a pressure or a pressure curve, or to record the same; but they also may be used to adjust the stroke of a valve in dependence on a control signal.

In conventional designes of pressure controllers, levers serve as the comparison elements. Nozzle - baffle plate systems associated with throttle amplifiers or alternative amplifiers are employed as the amplifier element. The variation of the correlation between the input pressure and the displacement or stroke of the comparison element is effected by the lever systems, the effective lever lengths of which are changed. Thus, the correlation is conducted mechanically. These conventional constructions exhibit the disadvantage that they are relatively expensive and require a plurality of individual parts.

The invention is based on the problem of avoiding these disadvantages and is accomplished by providing a pressure position adjusting controller which can be employed for the indication and recording of pressures, as well as for controlling the position of valves operating with pneumatic diaphragm action, which controller does not utilize any lever systems for varying the proportionality between pressure and output displacement.

The invention resides in the provision of an amplifier element in the form of a differential amplifier producing two output pressures, one output pressure being applied to a chamber having an elastic wall acting via a spring on one side on the comparison portion of the differential amplifier. In addition, a pressure is formed from the input pressure of the amplifier and the other output pressure of the amplifier, which pressure acts via an elastic wall on the other side of the comparison portion of the amplifier. Due to the fact that the invention utilizes a differential amplifier, closed chambers are, in each case, available for the input pressures, the effective surface areas of these chambers acting via the comparison portion of the amplifier on the control members of the amplifier for controlling the feed and discharge of pressurized air for the formation of the output pressures. The output pressures are to be derived from output channel bores, and so they are not directly effective on the comparator of the amplifier, as is the case, for example, in the alternative amplifier of conventional construction, wherein the output pressure is formed in a chamber defined by the elastic wall of the comparator. The degree of negative feedback of the output pressure with respect to the input pressure, and thus the signal amplification, is determined by the size of the effective surface areas.

The differential amplifier, in contrast to the above, offers the possibility to control, according to this invention, the extent of negative feedback of an output pressure signal on the comparator portion and to render this control adjustable, since the negative feedback is obtained by applying an output signal via a conduit to one of the two input pressure chambers via an adjustable throttle resistor. Moreover, the construction of the pressure controller according to this invention is very compact, since no lever systems are required.

It is particularly advantageous to provide a pressure distributor formed of throttle resistors, to which are applied the input pressure and at least one output pressure of the amplifier, and wherein, between the resistors, the control pressure at that point is effective on the elastic wall of one chamber of the amplifier. In this connection, at least one resistor is provided as a variable resistor. By means of this design, it is possible with the use of only simple structural elements, namely throttle resistors, to make the degree of negative feedback adjustable and thus to vary the proportionality between the input pressure and the displacement. Movable parts are eliminated for the most part, so that inertial effects and friction effects cannot occur.

A particularly advantageous embodiment of the invention is obtained by applying the $A^+$ output pressure of the amplifier to the diaphragm of a conventional pneumatic diaphragm-action drive moving a spindle provided with a valve closure or the like, wherein the movement of the spindle is transmitted to the spring provided at the amplifier. By this arrangement, a position controller for valves with pneumatic diaphragm action is provided wherein the stroke of the valve stem is transmitted to the spring connected to one side of the comparator portion of the amplifier. The spring introduces a force into the comparator which is proportional to the stroke or the position of the valve spindle. The diaphragm of the valve unit in this embodiment is to be considered as the elastic wall of one of the input pressure chambers of the differential pressure amplifier, the output of which, changing in the opposite sense, is fed back to the input. The number of the pressure chambers of the entire arrangement has been reduced to two, in this connection. Thus, in contrast to the conventional arrangements, a system has been provided requiring a minimum of total structural parts.

Another embodiment can also be advantageously employed, wherein both output pressures are applied to the diaphragms of a conventional double-acting diaphragm unit which moves the spindle and wherein likewise the motion of the spindle is transmitted to the spring connected to the comparison unit of the amplifier.

In all previous desgins, the correlation between the input pressure and the displacement is linear. However, in the control of valve positions, it is desirable to obtain a non-linear adjustable correlation of these values, since the stroke of the throttle element and the flow through the valve are likewise non-linear. Thus, the flow characteristics are non-linear. This problem has been solved theretofore by the arrangement of additional cam disks in the position controllers; however, the problem can be solved more advantageously, when using the pressure controller of this invention, in a very simple manner by arranging, in at least one of the conduits which provide the output pressures from the amplifier, a transmission member consisting of an ejector and at least one throttle resistor, which resistor is disposed in the reactive jet line and/or the back pressure line, or also in the suction pressure line or in one of the connecting lines between these pressure lines.

Such a transmission member is the subject matter of German application P 18 07 712.8. By means of such transmitting members, the correlation between the curves of reactive jet pressure and suction chamber pressure can be selected to be different so that it also becomes possible, without the use of mechanical parts, to obtain a non-linear correlation between pressure and displacement. Finally, it has also proved advantageous to provide, as the comparison portion of the amplifier, a member with two balls of identical diameter displaceably arranged in a housing bore, which member has at least two bores as the outlet openings, terminating into the housing bore and the spacing of which, as measured from one center to the other, corresponds to the diameter of the balls. Such amplifiers are described in German Pat. application P 19 55 083.5.

These and other objects, features and advantages of the present invention will become apparent from the following detailed description when taken in conjunction with the accompanying drawings, wherein.

Figure 1:
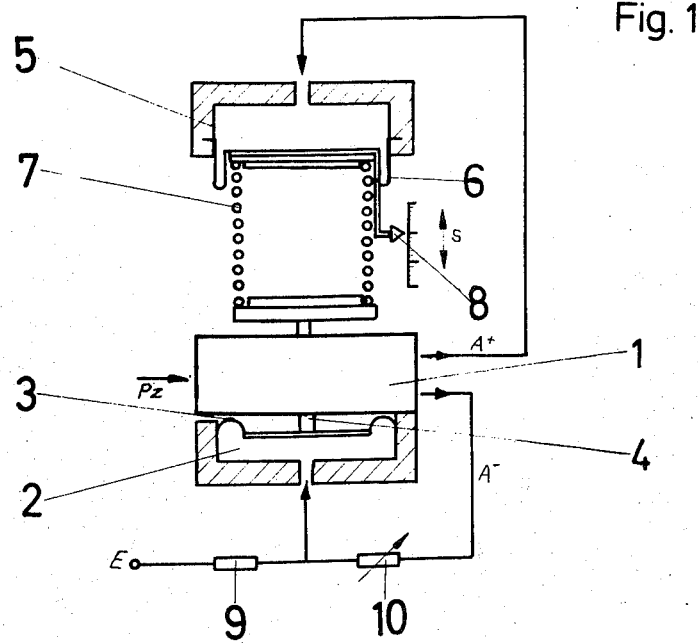
FIG. 1 is a schematic diagram of a displacement indicator wherein the shifting of a bellows, acting against a spring, serves as the indication.

In FIG. 1, a differential amplifier 1 is illustrated; one of the input pressure chambers 2 of this amplifier is defined by a housing part and the diaphragm 3, which is connected by way of the connecting rod 4 to the comparison portion of the amplifier. The other input pressure chamber which is normally provided in the amplifier is replaced by the pressure chamber 5 closed off by a bellows 6, the latter likewise being connected via the spring 7 to the comparison portion of the amplifier. The bellows 6 is coupled with an indicator 8 indicating in a proportional manner the change in the pressure value applied to the control input E.

The correlation between the path S traversed by the indicating device 8 and the pressure value at terminal E can be varied, in the illustrated embodiment, by applying this pressure value from terminal E via the pressure distributor consisting of the resistors 9 and 10 to the input chamber 2 of the differential amplifier. In this arrangement, the A⁻ output of the differential amplifier is applied to the adjustable resistor 10 of the pressure distributor, this output changing in an inversely proportional manner, with respect to the input value E. The A⁺ output signal of the amplifier, which likewise increases with an increasing input signal E, is applied to the pressure chamber 5. The adjustment of the proportionality between the input pressure E and the path S is obtained by the negative feedback of the A⁻ output to the input pressure chamber 2 via the pressure distributor, to which the input pressure E is likewise applied.

The extent of negative feedback is determined by the ratio of the fluid throttle resistances 9 and 10 of the pressure distributor. For adjustment purposes, it is sufficient to fashion one of the throttle resistors as an adjustable element, for example in the form of a needle valve. However, it is advantageous to make variable the resistor 10, to which the A⁻ output is applied. For, if this throttle 10 is then closed, i.e., if the resistance is infinitely large, no negative feedback is present and the maximum amplification is set. In contrast thereto, if this throttle resistance is fully opened, i.e., effectively provides zero resistance, a change of E has little effect on the pressure in the input pressure chamber 2 and the amplification is negligible.

Figure 2:
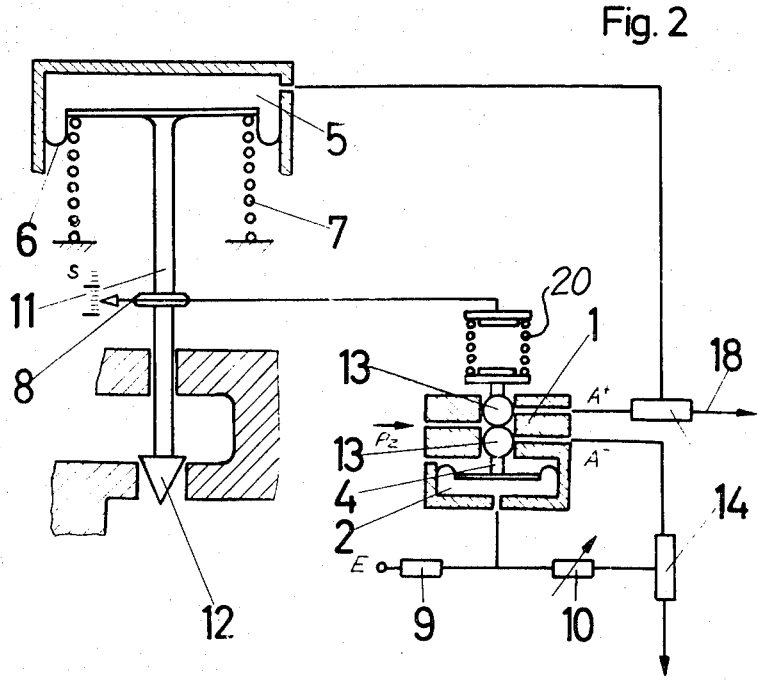
FIG. 2 is a schematic diagram of a valve controller wherein the position of a valve closure is adjustable and the respective position is also indicated.

An embodiment operating in the same manner as the arrangement of FIG. 1 is depicted in FIG. 2, where the A⁺ output of the amplifier 1 is likewise applied to the pressure chamber 5, the bellows 6 of which, however, displaces in this case a spindle 11 against the bias of the spring 7, this spindle being provided with a valve closure 12. The indicator 8 is rigidly coupled with the spindle 11.

In this embodiment, the stroke of the valve spindle 11 is rigidly transmitted to the spring 20, the latter resting on the comparator portion of the amplifier 1. In this case, as well as in the case of FIG. 1, the comparator portion of the amplifier may be formed by two balls 13 guided in a bore of the housing, which balls control the feed of air from the pressure source $p_z$ to the output channels A⁺ and A⁻ in dependence on the forces effective on the comparison portion from the chambers 2 and 5. The bores of the channels for the A⁺ output and the A⁻ output are designed in such a manner that their mutual spacing, measured from one center to the other, corresponds exactly to the diameter of the two identically large balls. The feed of pressurized air is effected via a bore having in each case a distance from the outlet bores of one-half a ball diameter.

The spring 20 applies a force to the comparison means formed by the balls 13 which is proportional to the stroke or the position of the valve spindle 11. The diaphragm 6 of the valve system is to be considered, in this case, to be the elastic wall of the absent E⁻ input pressure chamber of the differential pressure amplifier 1, the A⁺ output of which is fed back to the E⁻ input, i.e., to the pressure chamber 5.

The correlation between the input pressure at terminal E and the path S of the valve spindle 11 is linear. Since it is desired in the position control of valves to obtain a non-linear, adjustable correlation of these values, because the stroke of the throttle member and the flow through the valve are likewise non-linear, a transmission member 14 is inserted in the feedback lines, i.e., in the A⁺ and A⁻ branches of the amplifier, or only in one of the two branches; the structure of this transmission member can be seen in detail from FIG. 3. It can also be seen from FIG. 3 that the main element of the transmission member 14 is an injection nozzle 15 operating according to the ejector principle, the reactive jet pressure 16 of which is applied via a throttle resistor 16a to the A⁺ output, or optionally to the A⁻ output of the amplifier 1. The suction jet pressure 17 is also applied, via a throttle resistor 17a, to the pressure chamber 5, while the back pressure 18 is vented to the atmosphere in this case via a throttle resistor 18a.

Figure 3:
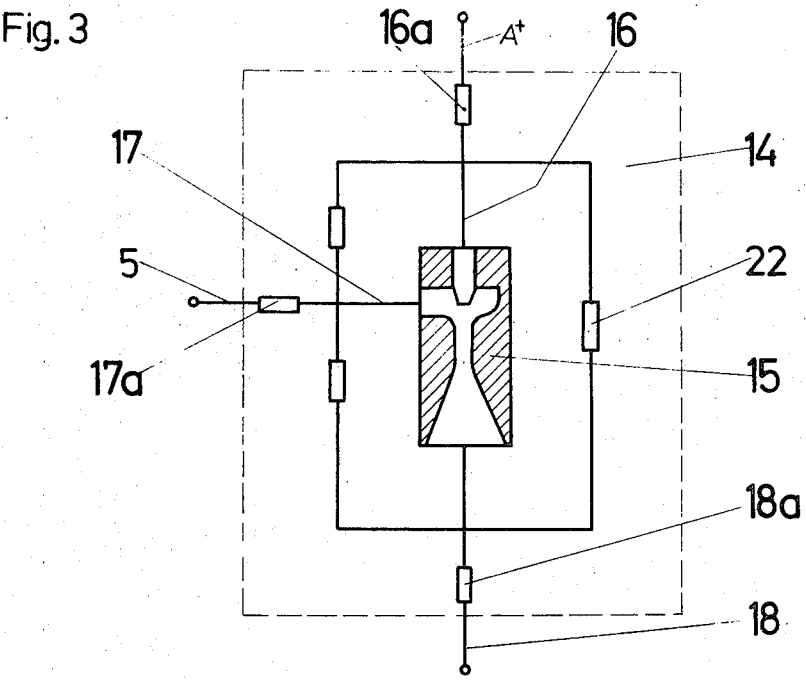
FIG. 3 is a schematic diagram of a transmission member of the ejector type which can be inserted in the return lines of the amplifier in order to obtain a non-linear correlation between pressure and displacement.

Throttle resistors can likewise be installed in the connecting lines between the reactive jet pressure, the suction pressure, and the back pressure, so that the correlation of the $A^+$ pressure to the pressure in the chamber 5 can thereby be varied as desired. It is unnecessary to dispose, as shown in FIG. 3, throttle resistors in all feed lines in the ejector and in the connecting lines. Depending on the intended correlation, it can, in certain cases, be also sufficient to provide an adjustable throttle resistor in only one of these lines of the feed conduits.

Figure 4:
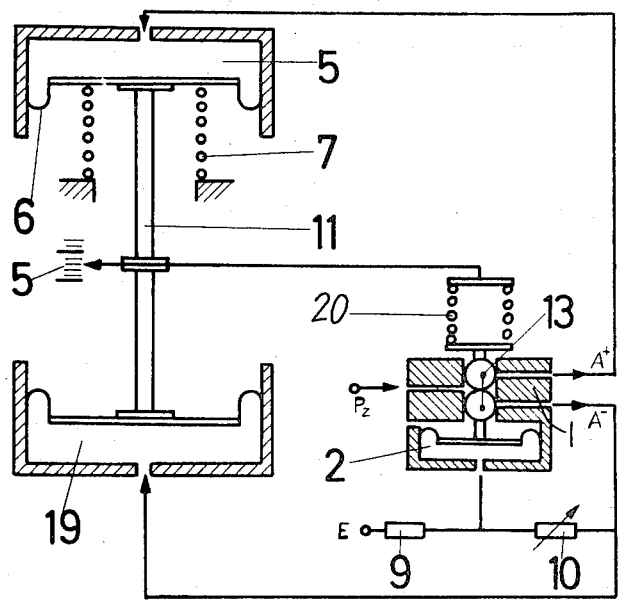
FIG. 4 is a schematic diagram of a pressure path converter of this invention connected with a double-acting diaphragm mechanism for the indication of displacement.

FIG. 4 shows an embodiment similar to that of FIG. 2, but wherein a double-acting diaphragm mechanism is provided and wherein the $A^+$ output pressure as well as the $A^-$ output pressure of the amplifier 1 are respectively applied to a pressure chamber 5 and pressure chamber 19, respectively, so that a controller system is also obtained wherein a given pressure E is adjustably correlated to a certain path S, without having to provide movable mechanical parts, such as levers or baffle plate arrangements. The pressure path converter itself in this way can be of a very compact design.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A pneumatic pressure position adjusting controller comprising a source of supply pressure, a differential pressure amplifier having first and second pressure chambers defined by elastic walls, a comparison portion responsive to the pressure in said first and second pressure chambers for producing first and second output pressures through control of said supply pressure, spring means connecting one side of said comparison portion to the elastic wall of said first pressure chamber, pressure distributor means for forming a control pressure by comparison of an input pressure and said second output pressure, including means for applying said control pressure to said second pressure chamber, the elastic wall of said second pressure chamber being connected to the other side of said comparison portion, means for connecting said first output pressure of said differential pressure amplifier to said first pressure chamber and said second output pressure to said pressure distributor means, the elastic wall of said first pressure chamber being connected to said spring means via a displaceable spindle, one end of said spindle being connected to the elastic wall of said first pressure chamber and the other end thereof being connected to a valve member to control the flow through a valve including said valve member with controlled displacement of said spindle.

* * * * *